(12) United States Patent
Iwasa et al.

(10) Patent No.: US 10,507,833 B2
(45) Date of Patent: Dec. 17, 2019

(54) VEHICLE CONTROL DEVICE AND METHOD FOR CONTROLLING THE SAME

(71) Applicant: JATCO Ltd, Fuji-shi, Shizuoka (JP)

(72) Inventors: Hiroki Iwasa, Atsugi (JP); Hironori Miyaishi, Sagamihara (JP); Tetsuya Izumi, Ayase (JP)

(73) Assignee: JATCO LTD, Fuji-Shi (JP)

( * ) Notice: Subject to any disclaimer, the term of this patent is extended or adjusted under 35 U.S.C. 154(b) by 112 days.

(21) Appl. No.: 15/558,825

(22) PCT Filed: Feb. 22, 2016

(86) PCT No.: PCT/JP2016/055000
§ 371 (c)(1),
(2) Date: Sep. 15, 2017

(87) PCT Pub. No.: WO2016/152354
PCT Pub. Date: Sep. 29, 2016

(65) Prior Publication Data
US 2018/0079418 A1    Mar. 22, 2018

(30) Foreign Application Priority Data
Mar. 23, 2015    (JP) ................................. 2015-059515

(51) Int. Cl.
*B60W 30/18*    (2012.01)
*B60K 6/40*    (2007.10)
(Continued)

(52) U.S. Cl.
CPC ......... *B60W 30/18127* (2013.01); *B60K 6/40* (2013.01); *B60K 6/48* (2013.01);
(Continued)

(58) Field of Classification Search
CPC ..... B60W 30/18127; B60W 2510/108; B60W 2540/10; B60W 2540/12;
(Continued)

(56) References Cited

FOREIGN PATENT DOCUMENTS

JP    H11-127502 A    5/1999
JP    2003-193877 A    7/2003
(Continued)

*Primary Examiner* — Anthony R Jimenez
(74) *Attorney, Agent, or Firm* — Foley & Lardner LLP

(57) ABSTRACT

A vehicle control device for controlling a vehicle including an oil pump driven by a transmission of a rotation of the motor-generator; and a hydraulic pressure supply unit for supplying a hydraulic pressure to the continuously variable transmission. The hydraulic pressure is generated by regulating a pressure of an oil discharged from the oil pump. When a regenerative braking is performed by the motor-generator based on a deceleration request from a driver, the hydraulic pressure supply unit supplies a hydraulic pressure based on a first hydraulic pressure and a second hydraulic pressure to the continuously variable transmission. The first hydraulic pressure is a hydraulic pressure to transmit an input torque input to the continuously variable transmission during the regenerative braking. The second hydraulic pressure is a hydraulic pressure to shift the continuously variable transmission during the regenerative braking. During the regenerative braking, the first hydraulic pressure is set to equal to or less than a hydraulic pressure found by subtracting the second hydraulic pressure from a hydraulic pressure suppliable to the continuously variable transmission.

7 Claims, 8 Drawing Sheets

(51) Int. Cl.
- B60K 6/48 (2007.10)
- B60K 6/543 (2007.10)
- B60L 7/14 (2006.01)
- B60W 10/02 (2006.01)
- B60W 10/08 (2006.01)
- B60W 10/10 (2012.01)
- B60W 10/30 (2006.01)
- B60W 20/00 (2016.01)
- F16H 59/22 (2006.01)
- B60L 7/10 (2006.01)
- B60W 10/107 (2012.01)
- F16H 61/00 (2006.01)
- F16H 61/662 (2006.01)
- B60L 50/16 (2019.01)

(52) U.S. Cl.
CPC ............... *B60K 6/543* (2013.01); *B60L 7/10* (2013.01); *B60L 7/14* (2013.01); *B60L 50/16* (2019.02); *B60W 10/02* (2013.01); *B60W 10/08* (2013.01); *B60W 10/10* (2013.01); *B60W 10/107* (2013.01); *B60W 10/30* (2013.01); *B60W 20/00* (2013.01); *F16H 59/22* (2013.01); *F16H 61/0021* (2013.01); *F16H 61/0028* (2013.01); *F16H 61/662* (2013.01); *F16H 61/66272* (2013.01); *B60W 2510/108* (2013.01); *B60W 2540/10* (2013.01); *B60W 2540/12* (2013.01); *B60W 2710/021* (2013.01); *B60W 2710/083* (2013.01); *B60W 2710/1005* (2013.01); *B60W 2710/1083* (2013.01); *B60Y 2200/92* (2013.01); *F16H 2061/66204* (2013.01); *F16H 2061/66286* (2013.01); *Y10S 903/918* (2013.01); *Y10S 903/93* (2013.01); *Y10S 903/946* (2013.01)

(58) Field of Classification Search
CPC ..... B60W 2710/021; B60W 2710/083; B60W 2710/1005; B60W 2710/1083; B60W 10/02; B60W 10/08; B60W 10/10; B60W 10/107; B60W 10/30; B60W 20/00; B60K 6/40; B60K 6/48; B60K 6/543; B60L 7/10; B60L 7/14; B60L 50/16; F16H 2061/66204; F16H 2061/66286; F16H 59/22; F16H 61/0021; F16H 61/0028; F16H 61/662; F16H 61/66272; Y10S 903/918; Y10S 903/93; Y10S 903/946; B60Y 2200/92
USPC ........................................................... 701/22
See application file for complete search history.

(56) References Cited

FOREIGN PATENT DOCUMENTS

| | | |
|---|---|---|
| JP | 2006-074997 A | 3/2006 |
| JP | 2014-231321 A | 12/2014 |

US 10,507,833 B2

VEHICLE CONTROL DEVICE AND METHOD FOR CONTROLLING THE SAME

TECHNICAL FIELD

The present invention relates to a vehicle control device and a method for controlling the same.

BACKGROUND ART

JP2003-193877A discloses one that increases an amount of power generation by an electric generator in a range of not causing a belt to slip in a vehicle where a power of an engine is transmitted to the electric generator via the belt.

SUMMARY OF INVENTION

It is thought that, when a vehicle including a continuously variable transmission between a motor-generator and driving wheels generates electricity by the motor-generator (hereinafter referred to as a regenerative braking) using the above technique, increasing the regenerative braking by the motor-generator in a range of not causing a belt slip in the continuously variable transmission.

Such vehicle sometimes shifts the continuously variable transmission during the regenerative braking. For example, while the vehicle decelerates, the regenerative braking is possibly performed while the continuously variable transmission is downshifted. Then, increasing a regenerative braking torque generated by the regenerative braking increases an input torque input to the continuously variable transmission. To prevent the belt slip in the continuously variable transmission against the increasing input torque, a hydraulic pressure (a belt capacity) supplied to the continuously variable transmission needs to be set high. Therefore, the most hydraulic pressure generated by regulating a pressure of an oil discharged from an oil pump is used to prevent the belt slip in the continuously variable transmission. This results in an insufficient hydraulic pressure to downshift the continuously variable transmission, possibly causing a shift failure where a following capability of an actual speed ratio to a target speed ratio is deteriorated.

The shift failure lowers rotation speeds of an input shaft of the continuously variable transmission and a rotation shaft of the oil pump coupled to the input shaft of the continuously variable transmission together with the deceleration of the vehicle, thereby lowering a discharge amount of the oil pump. Accordingly, the hydraulic pressure generated by regulating the pressure of the oil discharged from the oil pump lowers. This causes insufficient input and output of the amount of oil where the required hydraulic pressure is failed to be supplied to the continuously variable transmission or a similar component.

Especially, the continuously variable transmission requires the hydraulic pressure more than a stepped automatic transmission, which switches engagement/disengagement states of a friction engaging element for the shift. Therefore, the insufficient input and output of the amount of oil is likely to occur in the continuously variable transmission due to the above-described reduction in the rotation speed of the oil pump.

The present invention has been made in consideration of such points, and an object of the present invention is to reduce the insufficient input and output of the amount of oil during the regenerative braking.

According to an aspect of the present invention, a vehicle control device for controlling a vehicle includes: a continuously variable transmission disposed between a motor-generator and driving wheels; an oil pump configured to be driven by a transmission of a rotation of the motor-generator; and a hydraulic pressure supply unit configured to supply a hydraulic pressure to the continuously variable transmission, the hydraulic pressure being generated by regulating a pressure of an oil discharged from the oil pump. When a regenerative braking is performed by the motor-generator based on a deceleration request from a driver, the hydraulic pressure supply unit supplies a hydraulic pressure based on a first hydraulic pressure and a second hydraulic pressure to the continuously variable transmission. The first hydraulic pressure is a hydraulic pressure to transmit an input torque input to the continuously variable transmission during the regenerative braking. The second hydraulic pressure being a hydraulic pressure to shift the continuously variable transmission during the regenerative braking. During the regenerative braking, the first hydraulic pressure is set to equal to or less than a hydraulic pressure found by subtracting the second hydraulic pressure from a hydraulic pressure suppliable to the continuously variable transmission.

According to another aspect of the present invention, a method for controlling a vehicle includes a continuously variable transmission disposed between a motor-generator and driving wheels and an oil pump configured to be driven by a transmission of a rotation of the motor-generator, the vehicle supplying a hydraulic pressure to the continuously variable transmission, the hydraulic pressure being generated by regulating a pressure of an oil discharged from the oil pump. When a regenerative braking is performed by the motor-generator based on a deceleration request from a driver, the supplying supplies a hydraulic pressure based on a first hydraulic pressure and a second hydraulic pressure to the continuously variable transmission. The first hydraulic pressure is a hydraulic pressure to transmit an input torque input to the continuously variable transmission during the regenerative braking. The second hydraulic pressure is a hydraulic pressure to shift the continuously variable transmission during the regenerative braking. During the regenerative braking, the first hydraulic pressure is set to equal to or less than a hydraulic pressure found by subtracting the second hydraulic pressure from a hydraulic pressure suppliable to the continuously variable transmission.

These aspects secure the second hydraulic pressure to shift the continuously variable transmission during the regenerative braking. Accordingly, a shift failure of the continuously variable transmission can be reduced, a reduction in a rotation speed of a rotation shaft of the oil pump can be reduced, and insufficient input and output of an amount of the oil can be reduced.

DESCRIPTION OF EMBODIMENTS

The following describes an embodiment of the present invention with reference to the accompanying drawings. It should be noted that, in the following description, a "speed ratio" of a transmission is a value obtained by dividing an input rotation speed of the transmission by an output rotation speed of the transmission. A "Lowest speed ratio" is a maximum speed ratio when the speed ratio of the transmission is used, for example, when a vehicle starts. A "Highest speed ratio" is a minimum speed ratio of the transmission. Changing to a Low side so as to increase the speed ratio is referred to as a downshift, and changing to a High side so as to decrease the speed ratio is referred to as an upshift.

Figure 1:
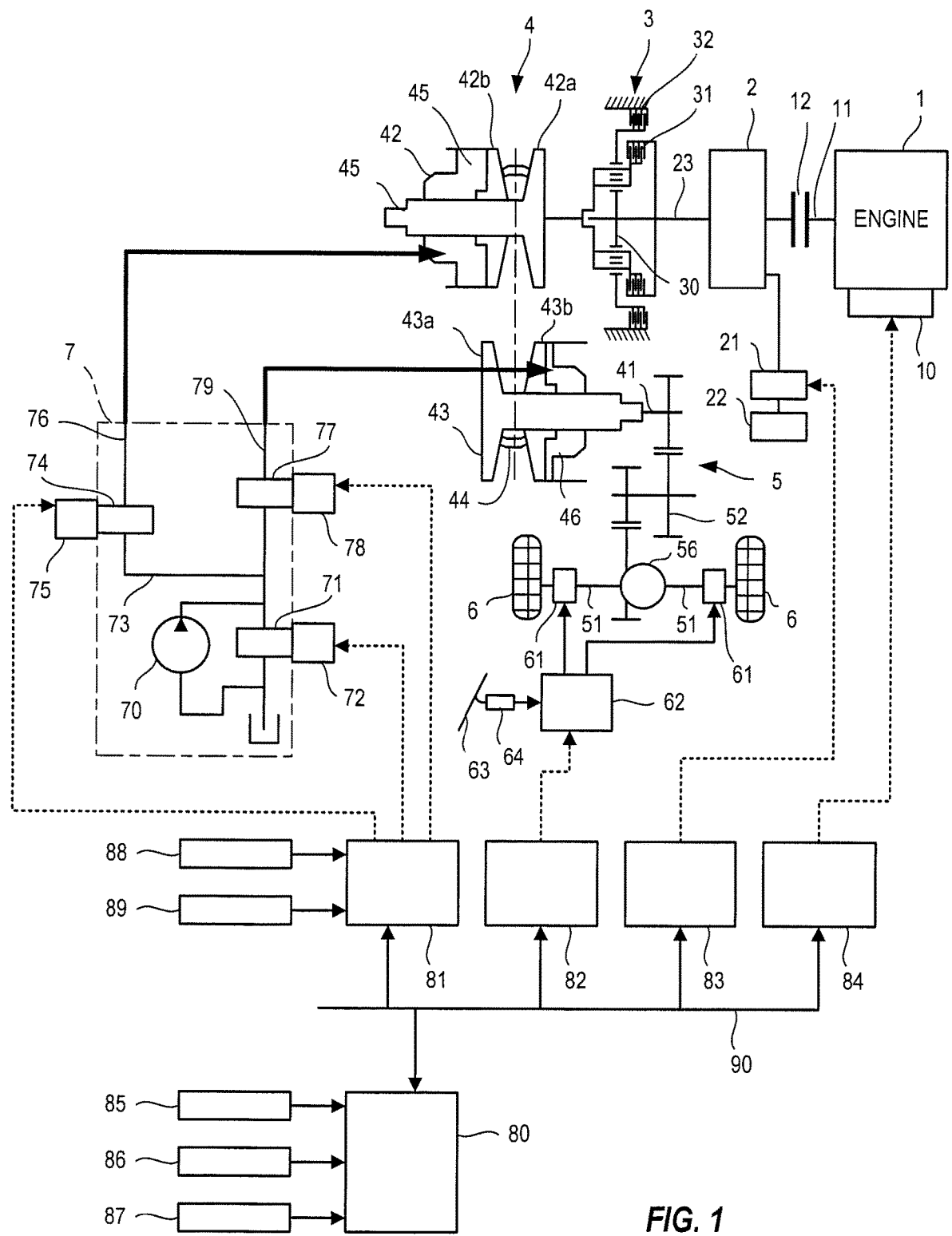
FIG. 1 is a schematic configuration diagram of a hybrid vehicle of an embodiment.

FIG. 1 is an explanatory view illustrating a configuration of a hybrid vehicle that includes a transmission 4 of the embodiment.

The vehicle includes an engine 1 and a motor-generator 2 as a driving source. An output rotation of the engine 1 or the motor-generator 2 is transmitted to driving wheels 6 via a forward/reverse switching mechanism 3, the transmission 4, and a final reduction mechanism 5.

The engine 1 includes an engine control actuator 10. The engine control actuator 10 operates the engine 1 with a desired torque based on a command from an engine control unit 84, which will be described later, to rotate an output shaft 11. Between the engine 1 and the motor-generator 2, a first clutch 12 is disposed. The first clutch 12 intermits rotation between the engine 1 and the motor-generator 2.

The motor-generator 2 is driven by electric power output from an inverter 21. The regenerative electric power of the motor-generator 2 obtained by regenerative braking is input to the inverter 21. The inverter 21 operates the motor-generator 2 with a desired torque based on a command from a motor control unit 83, which will be described later. The motor-generator 2 is, for example, constituted of a synchronous rotating electrical machine driven by three-phase current. The inverter 21 is coupled to a battery 22.

The forward/reverse switching mechanism 3 is disposed between the driving source formed of the engine 1 and the motor-generator 2, and the transmission 4. The forward/reverse switching mechanism 3 switches rotation input from an output shaft 23 in a forward rotation direction (forward running) or a reverse rotation direction (reverse running) to input the rotation to the transmission 4. The forward/reverse switching mechanism 3 includes a double-pinion-type planetary gear mechanism 30, a forward clutch 31, and a reverse brake 32. The forward/reverse switching mechanism 3 is switched in the forward rotation direction when the forward clutch 31 is engaged, and in the reverse rotation direction when the reverse brake 32 is engaged.

The planetary gear mechanism 30 is constituted of a sun gear to which the rotation of the driving source is input, a ring gear, and a carrier that supports pinions gear meshing with the sun gear and the ring gear. The forward clutch 31 is configured to integrally rotate the sun gear and the carrier depending on an engagement state. The reverse brake 32 is configured to stop rotation of the ring gear depending on an engagement state.

One of the forward clutch 31 and the reverse brake 32 of the forward/reverse switching mechanism 3 is configured as a second clutch that intermits the rotation between the engine 1 and the motor-generator 2, and the transmission 4.

The transmission 4 is arranged between the motor-generator 2 and the driving wheels 6. In a "HEV mode" described later, a torque generated by the engine 1 is transmitted to the transmission 4 via the first clutch 12, the motor-generator 2, and the forward/reverse switching mechanism 3. The transmission 4 is constituted by bridging a belt 44 between a primary pulley 42 and a secondary pulley 43. The transmission 4 is a belt continuously variable transmission mechanism (variator) that changes a winding diameter of the belt 44 to shift, by changing respective groove widths of the primary pulley 42 and the secondary pulley 43.

The primary pulley 42 includes a fixed pulley 42a and a movable pulley 42b. The movable pulley 42b moves by primary hydraulic pressure supplied to a primary hydraulic chamber 45 to change the groove width of the primary pulley 42.

The secondary pulley 43 includes a fixed pulley 43a and a movable pulley 43b. The movable pulley 43b operates by secondary hydraulic pressure supplied to a secondary hydraulic chamber 46 to change the groove width of the secondary pulley 43.

The belt 44 is bridged between a sheave surface having a V shape formed of the fixed pulley 42a and the movable pulley 42b of the primary pulley 42 and a sheave surface having a V shape formed of the fixed pulley 43a and the movable pulley 43b of the secondary pulley 43.

The final reduction mechanism 5 transmits output rotation from a transmission output shaft 41 of the transmission 4 to the driving wheels 6. The final reduction mechanism 5 includes a plurality of gear trains 52 and a differential gear 56. Axle shafts 51 are coupled to the differential gear 56 to rotate the driving wheels 6.

The driving wheel 6 includes a brake 61. Braking force of the brake 61 is controlled by a brake actuator 62 based on a command from a brake control unit 82, which will be described later. The brake actuator 62 controls braking force of the brake 61 based on a detection amount of a brake sensor 64 that detects a pedal force of a brake pedal 63. When a driver presses the brake pedal 63, a brake signal BRK from the brake sensor 64 turns ON. When the driver does not press the brake pedal 63, the brake signal BRK turns OFF. The brake actuator 62 may be a fluid pressure actuator. The brake sensor 64 transforms the pedal force of the brake pedal 63 into the brake fluid pressure. Based on this brake fluid pressure, the brake actuator 62 may control the braking force of the brake 61.

Hydraulic pressure from a shift hydraulic control unit 7 is supplied to the primary pulley 42 and the secondary pulley 43 of the transmission 4.

The shift hydraulic control unit 7 includes a regulator valve 71 and a line pressure solenoid 72. The regulator valve 71 controls a hydraulic pressure generated by oil (also used for lubricating oil) discharged from an oil pump 70 to a line pressure PL. The line pressure solenoid 72 operates the regulator valve 71. The line pressure PL is supplied to a first pressure regulating valve 74 and a second pressure regulating valve 77 by a line pressure oil passage 73. The first pressure regulating valve 74 is operated by a primary hydraulic pressure solenoid 75 to supply the primary hydraulic pressure to a primary pressure oil passage 76. The second pressure regulating valve 77 is operated by a secondary hydraulic pressure solenoid 78 to supply the secondary hydraulic pressure to a secondary pressure oil passage 79. The line pressure solenoid 72, the primary hydraulic pressure solenoid 75, and the secondary hydraulic pressure solenoid 78 operate corresponding to a command from a CVT control unit 81 to control the respective hydraulic pressures. The shift hydraulic control unit 7 also supplies the lubricating oil to the forward/reverse switching mechanism 3, the transmission 4, and the like.

The oil pump 70 is coupled to the output shaft 23 between the motor-generator 2 and the forward/reverse switching mechanism 3 via a sprocket, a chain, or the like. The rotation of the output shaft 23 is transmitted to drive the oil pump 70.

The CVT control unit 81, the brake control unit 82, the motor control unit 83, the engine control unit 84, and a hybrid control module 80, which will be described later, are communicatively coupled to one another via a CAN 90.

Signals from a primary rotation sensor 88, a secondary rotation sensor 89, and the like are input to the CVT control unit 81. The CVT control unit 81 transmits the command to the shift hydraulic control unit 7 based on the input signal. The hydraulic pressure of the shift hydraulic control unit 7 is also supplied to the transmission 4 and the forward/reverse switching mechanism 3. The CVT control unit 81 also controls the engagement states of the forward clutch 31 and the reverse brake 32 of the forward/reverse switching mechanism 3.

Figure 2:
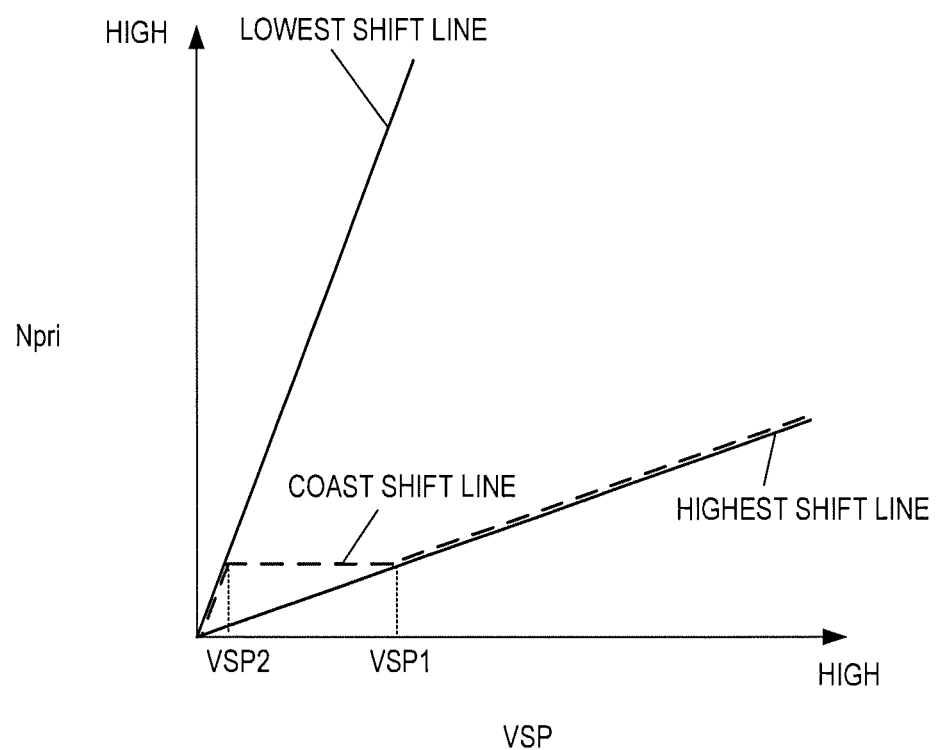
FIG. 2 is a shift map of a transmission.

In the transmission 4, the CVT control unit 81 and the shift hydraulic control unit 7 perform the shift based on a shift map illustrated in FIG. 2. In this shift map, an operating point of the transmission 4 is defined by a vehicle speed VSP and a primary rotation speed Npri. A gradient of a line that couples the operating point of the transmission 4 to a zero point at a lower-left corner of the shift map corresponds to a speed ratio of the transmission 4. The transmission 4 can shift between a Lowest shift line and a Highest shift line illustrated in FIG. 2. In this shift map, although not illustrated in detail, a shift line is set per an accelerator position APO. The shift of the transmission 4 is performed in accordance with the shift line selected corresponding to the accelerator position APO. In the shift map, a coast shift line is set as a shift line when the accelerator pedal is not pressed (the accelerator position APO=0). While the accelerator pedal is not pressed, the coast shift line is set such that a rotation speed Nop of the rotation shaft of the oil pump 70 does not become lower than a lower limit rotation speed Nolim, which is determined from a lower limit value of input and output of the amount of oil of the oil pump 70. That is, the coast shift line is set such that the hydraulic pressure required for, for example, the transmission 4 can be supplied based on the line pressure PL generated by a minimum discharge amount discharged from the oil pump 70 by the lower limit rotation speed Nolim, that is, the input and output of the amount of oil do not become insufficient. It should be noted that, a safety factor may be added to the lower limit value to set the lower limit rotation speed Nolim. The coast shift line matches the Highest shift line when the vehicle speed VSP is equal to or more than a first predetermined vehicle speed VSP1. The coast shift line matches the Lowest shift line when the vehicle speed VSP is equal to or less than a second predetermined vehicle speed VSP2 lower than the first predetermined vehicle speed VSP1. In FIG. 2, the coast shift line is indicated with a dashed line. When the coast shift line matches the Lowest shift line and the Highest shift line, the coast shift line is displaced to be indicated for explanation.

The hybrid control module 80 manages consumption energy of a whole vehicle. The hybrid control module 80 controls the consumption energy to enhance energy efficiency by controlling the driving of the engine 1 and the motor-generator 2.

Signals from an accelerator position sensor 85, a vehicle speed sensor 86, an inhibitor switch sensor 87, and the like and information from the respective control units via a CAN communication line are input to the hybrid control module 80. The hybrid control module 80 calculates a target driving torque Td and a target braking torque Tb from these signals and information. When the driver presses the brake pedal 63, the hybrid control module 80 sets the target braking torque Tb. The hybrid control module 80 sets a remain found by subtracting a regenerative braking torque Trg, which is a maximum regenerative torque that can be generated in the motor-generator 2, from the target braking torque Tb as a fluid pressure braking torque Trq. The hybrid control module 80 obtains the target braking torque Tb from a sum of the regenerative braking torque Trg and the fluid pressure braking torque Trq. The hybrid control module 80 generates the target braking torque Tb in the motor-generator 2 in deceleration to recover the electric power. It should be noted that, the first clutch 12 is disengaged during the regenerative braking.

The brake control unit 82 outputs a driving command to the brake actuator 62 based on a control command from the hybrid control module 80. The brake control unit 82 obtains information of the brake fluid pressure that is being generated in the brake actuator 62 to transmit the information to the hybrid control module 80.

The motor control unit 83 outputs a target power running command (a positive torque command) PR or a target regeneration command (a negative torque command) RG to the inverter 21 based on the control command from the hybrid control module 80. The motor control unit 83 detects an actual current value and the like applied to the motor-generator 2 to obtain actual motor driving torque information, thus transmitting the information to the hybrid control module 80.

The engine control unit 84 outputs the driving command to the engine control actuator 10 based on the control command from the hybrid control module 80. The engine control unit 84 transmits actual engine driving torque information obtained from a rotation speed Ne, a fuel injection quantity, and the like of the engine 1 to the hybrid control module 80.

The hybrid control module 80 performs the control corresponding to the following modes.

The vehicle has an electric vehicle mode (hereinafter referred to as an "EV mode") and a hybrid vehicle mode (hereinafter referred to as a "HEV mode") as operation modes.

The "EV mode" is a mode where the first clutch 12 is in a disengagement state, and the driving source is only the motor-generator 2. The "EV mode" is selected, for example, when a request driving force is low, and a battery SOC (State of Charge) is sufficiently ensured.

The "HEV mode" is a mode where the first clutch 12 is in the engagement state, and the driving source is the engine 1 and the motor-generator 2. The "HEV mode" is selected, for example, when the request driving force is large, or when the battery SOC for driving the motor-generator 2 is insufficient.

The following describes a relationship with the hydraulic pressure required for the transmission 4 during the regenerative braking.

As described above, the motor-generator 2 generates the regenerative braking torque Trg during the deceleration. However, generating the regenerative braking torque Trg inputs a torque corresponding to the regenerative braking torque Trg as a negative value to the transmission 4 from the motor-generator 2 side. Even if an input torque Tin including the torque corresponding to the regenerative braking torque Trg is input to the transmission 4, the hydraulic pressure supplied to the transmission 4 is controlled so as not to cause the belt slip. Therefore, the hydraulic pressure not causing the belt slip in the transmission 4 (hereinafter referred to as a first hydraulic pressure Psec1) is required. Since the torque corresponding to the regenerative braking torque Trg becoming the negative torque is input to the transmission 4 during the regenerative braking, the first hydraulic pressure Psec1 is raised compared with the first hydraulic pressure Psec1 before the regenerative braking is performed.

In the case where the driver does not press the accelerator pedal and the brake pedal 63 is pressed, a target speed ratio it is set at the transmission 4 along a coast shift line, and the hydraulic pressure supplied to the transmission 4 is controlled such that an actual speed ratio ia changes following the target speed ratio it. For example, when the vehicle speed VSP lowers and becomes lower than the first predetermined vehicle speed VSP1, the downshift, which changes the actual speed ratio ia to the Low side in association with the reduction in the vehicle speed VSP, is performed. Therefore, the hydraulic pressure at which the actual speed ratio ia changes following the target speed ratio it is required.

An electric power Pm obtained by the regeneration by the motor-generator 2 can be expressed like Formula (1) in a relationship between the regenerative braking torque Trg (a motor torque Tm) of the motor-generator 2, the rotation speed of the rotation shaft of the motor-generator 2 (hereinafter referred to as a motor rotation speed Nm), and a unit conversion coefficient k.

$$Pm = Trg \times Nm \times k \quad (1)$$

Figure 3:
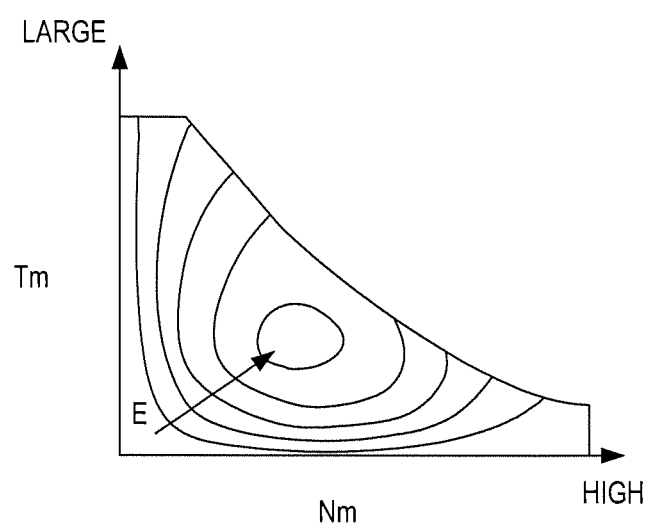
FIG. 3 is a map illustrating a relationship between a motor rotation speed, a regenerative braking torque, and a regeneration efficiency.

The increase in the motor rotation speed Nm increases the electric power Pm obtained by the motor-generator 2. Therefore, it is considered to downshift the transmission 4 during the regenerative braking and raise the motor rotation speed Nm. However, the relationship between the motor rotation speed Nm, the regenerative braking torque Trg, and a regeneration efficiency (power generation efficiency) E of the motor-generator 2 is like the map in FIG. 3. The increase in the motor rotation speed Nm lowers the regeneration efficiency E of the motor-generator 2 from a certain rotation speed. In FIG. 3, the equal regeneration efficiency E is connected with the line. As the regeneration efficiency E approaches the arrow direction, the regeneration efficiency E of the motor-generator 2 rises.

Therefore, during the regenerative braking, it is desirable to set the regenerative braking torque Trg and the motor rotation speed Nm so as to raise the regeneration efficiency E of the motor-generator 2, shift the transmission 4 to set the motor rotation speed Nm where the regeneration efficiency E of the motor-generator 2 is high and set the regenerative braking torque Trg where the regeneration efficiency E of the motor-generator 2 is high. In this case, the hydraulic pressure to shift the speed ratio of the transmission 4 to set the motor rotation speed Nm where the regeneration efficiency E of the motor-generator 2 is high is required.

In the case where the transmission 4 is downshifted during the regenerative braking to raise the regeneration efficiency E of the motor-generator 2, the target speed ratio it is possibly out of the coast shift line and set to the Low side. In such case, the transmission 4 requires a hydraulic pressure of adding the hydraulic pressure required for the downshift along the coast shift line to the hydraulic pressure required for the shift to raise the regeneration efficiency E of the motor-generator 2 (hereinafter referred to as a second hydraulic pressure Psec2).

Accordingly, during the regenerative braking, a required secondary pressure Psecn as a sum of the first hydraulic pressure Psec1, which is the hydraulic pressure at which the belt slip does not occur in the transmission 4 (a torque capacity), and the second hydraulic pressure Psec2, which is the hydraulic pressure required for the shift, is required as a secondary pressure.

The following describes a relationship between the required secondary pressure Psecn and an actual secondary pressure (a maximum secondary pressure) Pseca, which is supplied using the hydraulic pressure generated by the oil discharged from the oil pump 70.

Figure 4A:
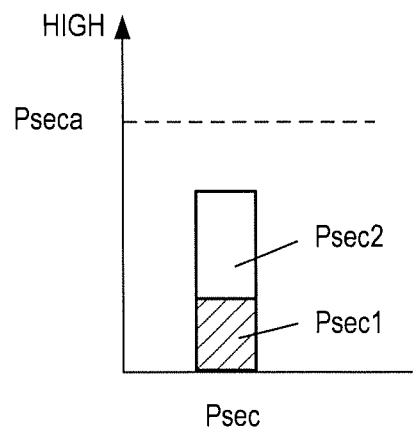
FIG. 4A is a drawing illustrating a relationship between a required secondary pressure and an actual secondary pressure.

When there is no deceleration request and the regenerative braking is not performed, as illustrated in FIG. 4A, the required secondary pressure Psecn is lower than the actual secondary pressure Pseca, which is supplied using the hydraulic pressure generated by the oil discharged from the oil pump 70. Accordingly, the belt slip does not occur in the transmission 4, and the shift failure where the change in the actual speed ratio ia delays relative to the target speed ratio it does not occur.

Figure 4B:
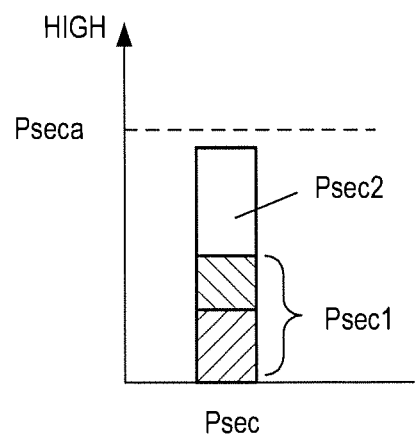
FIG. 4B is a drawing illustrating the relationship between the required secondary pressure and the actual secondary pressure.

When the driver presses the brake pedal 63 and the deceleration request is executed to start the regenerative braking, the hydraulic pressure required so as not to cause the belt slip increases relative to the input torque Tin by the amount that the regenerative braking torque Trg occurs; therefore, the first hydraulic pressure Psec1 increases. FIG. 4B and after FIG. 4B, this increment is shown by the hatching downward to the right. Here, the deceleration request is small, and as illustrated in FIG. 4B, the required secondary pressure Psecn is lower than the actual secondary pressure Pseca. Accordingly, the belt slip does not occur in the transmission 4 and the shift failure does not occur. It should be noted that, the shift to raise the regeneration efficiency E of the motor-generator 2 is not considered here.

Figure 4C:
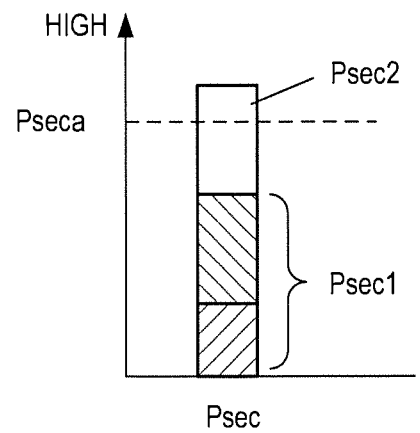
FIG. 4C is a drawing illustrating the relationship between the required secondary pressure and the actual secondary pressure.

When the deceleration request becomes large and the regenerative braking torque Trg increases, the first hydraulic pressure Psec1 rises. As illustrated in FIG. 4C, the required secondary pressure Psecn becomes higher than the actual secondary pressure Pseca. However, since the hydraulic pressure exceeding the actual secondary pressure Pseca cannot be supplied to the secondary pulley 43, the secondary pulley 43 results in the insufficient hydraulic pressure exceeding the actual secondary pressure Pseca. In such case, the actual speed ratio ia delays following the target speed ratio it, causing the shift failure in the downshift.

Figure 4D:
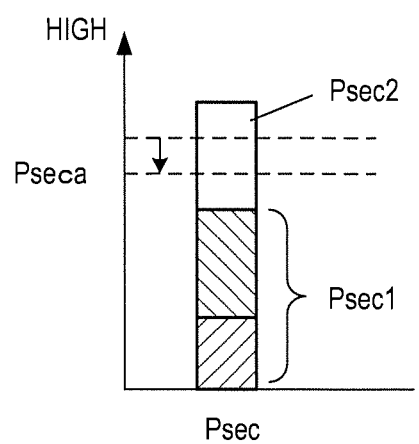
FIG. 4D is a drawing illustrating the relationship between the required secondary pressure and the actual secondary pressure.

In addition to the reduction in the vehicle speed VSP, when the shift failure occurs in the secondary pulley 43 during the downshift, the rotation speed Nop of the rotation shaft of the oil pump 70 cannot be maintained. This lowers the rotation speed Nop and lowers the discharge amount of the oil pump 70, leading to the low actual secondary pressure Pseca as illustrated in FIG. 4D. Here, while the shift failure occurs in the downshift, the actual secondary pressure Pseca is higher than the first hydraulic pressure Psec1, thereby not causing the belt slip in the transmission 4.

Figure 4E:
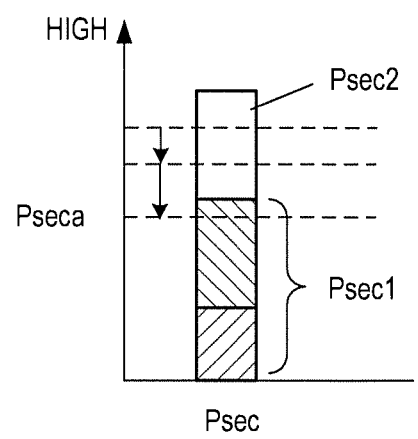
FIG. 4E is a drawing illustrating the relationship between the required secondary pressure and the actual secondary pressure.

Further, when the vehicle speed VSP lowers and the shift failure progresses, the rotation speed Nop of the rotation shaft of the oil pump 70 lowers further and the discharge amount of the oil pump 70 lowers further. Therefore, as illustrated in FIG. 4E, when the actual secondary pressure Pseca lowers further and the actual secondary pressure Pseca becomes lower than the first hydraulic pressure Psec1, the belt slip occurs in the transmission 4.

Thus, when the regenerative braking starts according to the deceleration request, the required secondary pressure Psecn becomes higher than the actual secondary pressure Pseca, and the shift failure of the downshift occurs in the transmission 4, the actual secondary pressure Pseca lowers. Consequently, the belt slip possibly occurs in the transmission 4.

It should be noted that, although the explanation using FIG. 4A to FIG. 4E does not consider the shift by the transmission 4 to raise the regeneration efficiency E of the motor-generator 2, taking this into consideration raises the second hydraulic pressure Psec2 required for the shift, thereby the above-described problem is more likely to occur.

Figure 5:
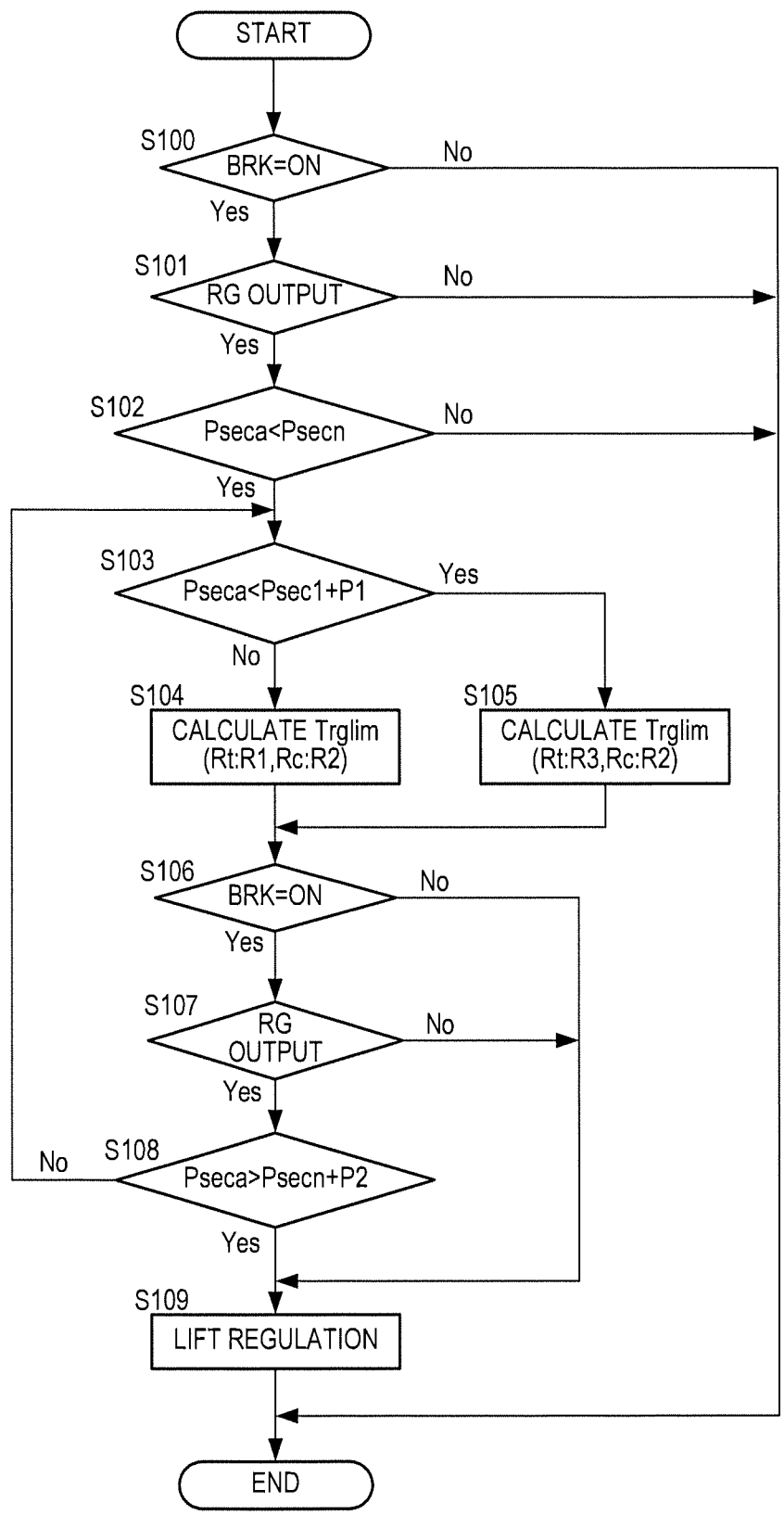
FIG. 5 is a flowchart describing a regenerative braking torque regulating control.

Therefore, this embodiment performs a regenerative braking torque regulating control described later. FIG. 5 is a flowchart describing the regenerative braking torque regulating control.

At Step S100, the CVT control unit 81 determines whether the brake pedal 63 is pressed. When the brake pedal 63 is pressed and the brake signal BRK is ON, the process proceeds to Step S101. When the brake pedal 63 is not pressed and the brake signal BRK is OFF, the process at this time is terminated.

At Step S101, the CVT control unit 81 determines whether the target regeneration command RG is output. When the target regeneration command RG is output, the process proceeds to Step S102. When the target regeneration command RG is not output, the process at this time is terminated.

At Step S102, the CVT control unit 81 determines whether the actual secondary pressure Pseca is lower than the required secondary pressure Psecn. When the actual secondary pressure Pseca is lower than the required secondary pressure Psecn, the CVT control unit 81 determines that the secondary pressure is insufficient. When the actual secondary pressure Pseca is lower than the required secondary pressure Psecn, the process proceeds to Step S103. When the actual secondary pressure Pseca is equal to or more than the required secondary pressure Psecn, the process at this time is terminated.

At Step S103, the CVT control unit 81 determines whether the actual secondary pressure Pseca is lower than a pressure found by adding a first predetermined pressure P1 to the first hydraulic pressure Psec1. The first predetermined pressure P1 is the preset pressure. The first predetermined pressure P1 is the pressure that can determine a possibility of causing the belt slip in the transmission 4 when the actual secondary pressure Pseca becomes lower than the pressure found by adding the first predetermined pressure P1 to the first hydraulic pressure Psec1. When the actual secondary pressure Pseca is equal to or more than the pressure found by adding the first predetermined pressure P1 to the first hydraulic pressure Psec1, the process proceeds to Step S104. When the actual secondary pressure Pseca is lower than the pressure found by adding the first predetermined pressure P1 to the first hydraulic pressure Psec1, the process proceeds to Step S105.

At Step S104, the CVT control unit 81 sets the first hydraulic pressure Psec1 such that the first hydraulic pressure Psec1 becomes equal to or less than the pressure found by subtracting the second hydraulic pressure Psec2, which is required to shift the transmission 4, from the actual secondary pressure Pseca, which is the hydraulic pressure that can be supplied to the secondary pulley 43. The CVT control unit 81 outputs a regenerative braking torque regulation value Trglim so as not to cause the belt slip by the set first hydraulic pressure Psec1. Specifically, the CVT control unit 81 calculates a pressure difference between the required secondary pressure Psecn and the actual secondary pressure Pseca. The CVT control unit 81 converts the pressure difference into the regenerative braking torque Trg and calculates the regenerative braking torque regulation value Trglim. The regenerative braking torque regulation value Trglim is a decreased amount of the regenerative braking torque Trg corresponding to the pressure difference. As the regenerative braking torque regulation value Trglim increases, the regenerative braking torque Trg decreases (the absolute value decreases) and the input torque Tin also decreases (the absolute value decreases). That is, the regenerative braking torque Trg lowers in the motor-generator 2 by the amount of the insufficient secondary pressure, and the input torque Tin also lowers in association with this.

The CVT control unit 81 sets a torque regulation rate of change (an increased amount per unit time) Rt of the regenerative braking torque regulation value Trglim when the regenerative braking torque Trg is regulated to a first rate of change R1. When the regenerative braking torque Trg is regulated and lowered, the braking torque by the amount is supplemented by increasing the fluid pressure braking torque Trq. However, in the case where the increase in the fluid pressure braking torque Trq does not catch up with the reduction in the regenerative braking torque Trg, the braking force temporarily lowers, giving uncomfortable feeling to the driver. The first rate of change R1 is set to a value at which the increase in the fluid pressure braking torque Trq follows the reduction in the regenerative braking torque Trg without delay and the driver does not feel uncomfortable. The CVT control unit 81 sets a torque regulation reduction rate of change (a decreased amount per unit time) Rc of the regenerative braking torque regulation value Trglim when the regulation of the regenerative braking torque Trg is reduced to a second rate of change R2. The second rate of change R2 is set to a value at which the reduction in the fluid pressure braking torque Trq follows the increase in the regenerative braking torque Trg without delay and the driver does not feel uncomfortable.

At Step S105, similar to Step S104, the CVT control unit 81 sets the first hydraulic pressure Psec1 and calculates the regenerative braking torque regulation value Trglim. In the case where the actual secondary pressure Pseca is lower than the pressure found by adding the first predetermined pressure P1 to the first hydraulic pressure Psec1, the belt slip possibly occurs in the transmission 4. Accordingly, the CVT control unit 81 sets the torque regulation rate of change Rt to a third rate of change R3 larger than the first rate of change R1. Specifically, the third rate of change R3 is so as to stepwisely change the regenerative braking torque regulation value Trglim. It should be noted that, the CVT control unit 81 sets the torque regulation reduction rate of change Rc to the second rate of change R2 similar to Step S104.

The regenerative braking torque regulation value Trglim, the torque regulation rate of change Rt, and the torque regulation reduction rate of change Rc are sent to the hybrid control module 80. Based on this, the hybrid control module 80 outputs a control command to regulate the regenerative braking torque Trg of the motor-generator 2 to the motor control unit 83. When the regenerative braking torque Trg lowers based on the regenerative braking torque regulation value Trglim, the first hydraulic pressure Psec1 lowers and the actual secondary pressure Pseca becomes higher than the required secondary pressure Psecn. Thus, since the regulation of the regenerative braking torque Trg lowers the input torque Tin, the first hydraulic pressure Psec1 becomes equal to or less than the pressure found by subtracting the second hydraulic pressure Psec2 from the actual secondary pressure Pseca.

At Step S106, the CVT control unit 81 determines whether the brake pedal 63 is pressed. When the brake pedal 63 is pressed and the brake signal BRK is ON, the process proceeds to Step S107. When the brake pedal 63 is not pressed, the process proceeds to Step S109.

At Step S107, the CVT control unit 81 determines whether the target regeneration command RG is output. When the target regeneration command RG is output, the process proceeds to Step S108. When the target regeneration command RG is not output, the process proceeds to Step S109.

At Step S108, the CVT control unit 81 determines whether the actual secondary pressure Pseca is higher than the value found by adding a second predetermined pressure P2 to the required secondary pressure Psecn. The second predetermined pressure P2 is a preset pressure. The second predetermined pressure P2 is a value at which, even if the regulation on the regenerative braking torque Trg is lifted, the actual secondary pressure Pseca does not become insufficient relative to the required secondary pressure Psecn. When the actual secondary pressure Pseca is higher than a value found by adding the second predetermined pressure P2 to the required secondary pressure Psecn, the process proceeds to Step S109. When the actual secondary pressure Pseca is equal to or less than the value found by adding the second predetermined pressure P2 to the required secondary pressure Psecn, the process returns to Step S103 and the above-described processes are repeated.

At Step S109, the CVT control unit 81 lifts the regulation on the regenerative braking torque Trg. The CVT control unit 81 zeroes the regenerative braking torque regulation value Trglim.

It should be noted that, a control unit other than the CVT control unit 81 may perform a part of the processes. For example, the hybrid control module 80 may calculate the regenerative braking torque regulation value Trglim, the torque regulation rate of change Rt, and the torque regulation reduction rate of change Rc.

Figure 6:
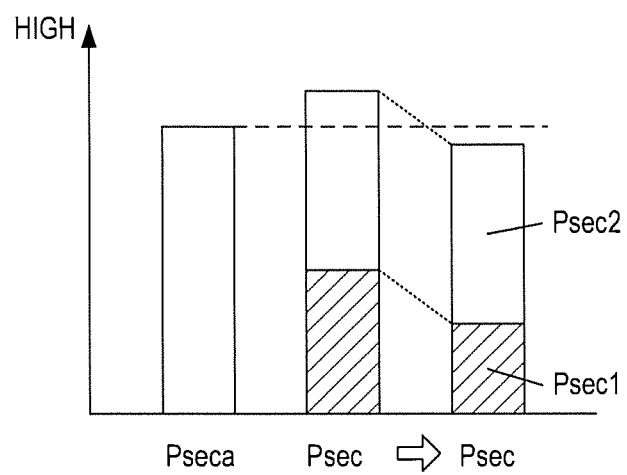
FIG. 6 is a drawing illustrating the relationship between the required secondary pressure and the actual secondary pressure with the use of this embodiment.

Thus, in the case where the actual secondary pressure Pseca is lower than the required secondary pressure Psecn, lowering (regulating) the regenerative braking torque Trg without lowering the second hydraulic pressure Psec2 required for the shifting by the transmission 4 lowers the input torque Tin to the transmission 4 to lower the first hydraulic pressure Psec1. This reduces the required secondary pressure Psecn becoming higher than the actual secondary pressure Pseca as illustrated in FIG. 6. That is, the shift (the downshift) in the transmission 4 is prioritized to execute the shift and reduce the shift failure and the regenerative braking torque Trg is regulated. This reduces the required secondary pressure Psecn becoming higher than the actual secondary pressure Pseca, thus reducing the belt slip.

Figure 7:
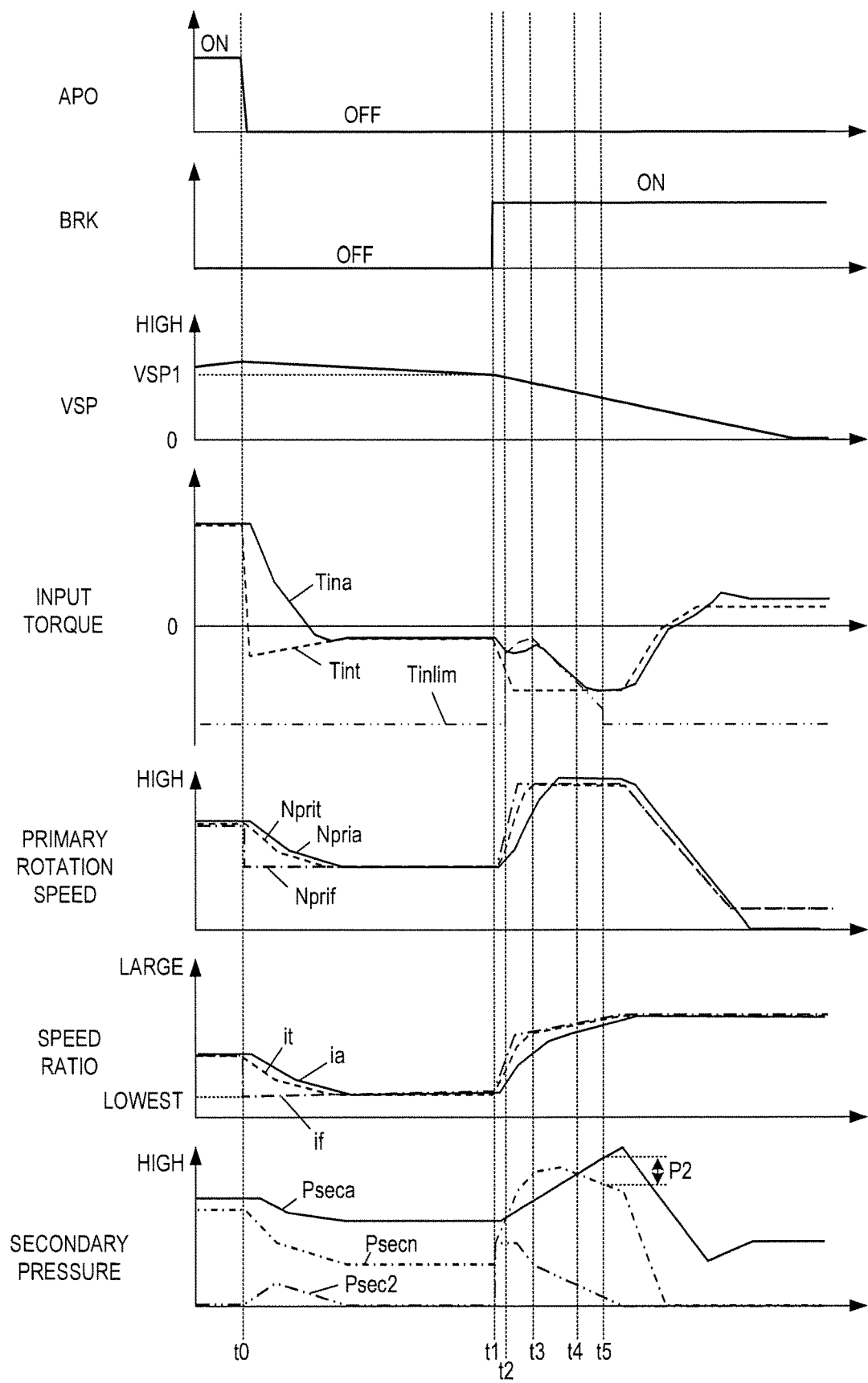
FIG. 7 is a timing chart describing the regenerative braking torque regulating control.

The following describes the case of performing the regenerative braking torque regulating control with reference to the timing chart in FIG. 7. It should be noted that, the vehicle runs in a state where the vehicle speed VSP is higher than the first predetermined vehicle speed VSP1.

At a time t0, the accelerator pedal is not pressed, the accelerator position APO becomes zero, and the vehicle performs a coast running. A shift line indicative of a final target speed ratio if is stepwisely changed to the coast shift line (a Highest shift line) according to the accelerator position APO. In association with this, the target speed ratio it gradually changes such that the actual speed ratio ia becomes the Highest speed ratio, and the actual speed ratio ia changes following the target speed ratio it. Regarding the speed ratios in FIG. 7, the final target speed ratio if is indicated by the one dot chain line, the target speed ratio it by the dashed line, and the actual speed ratio ia by the solid line.

A target primary rotation speed Nprif is stepwisely changed in accordance with the final target speed ratio if. An actual primary rotation speed Npria (the motor rotation speed Nm) gradually lowers in accordance with the actual speed ratio ia. Regarding the primary rotation speeds in FIG. 7, the target primary rotation speed Nprif is indicated by the one dot chain line and the actual primary rotation speed Npria by the solid line. Regarding the primary rotation speed in FIG. 7, a primary rotation speed Nprit corresponding to the target speed ratio it is indicated by the dashed line for explanation.

In association with the reduction in the actual primary rotation speed Npria, a flow rate of the oil discharged from the oil pump 70 lowers; therefore, the actual secondary pressure Pseca lowers. As the actual speed ratio ia approaches the Highest speed ratio, the required secondary pressure Psecn also lowers. Regarding the secondary pressures in FIG. 7, the required secondary pressure Psecn is indicated by the one dot chain line, the second hydraulic pressure Psec2 by the two-dot chain line, and the actual secondary pressure Pseca by the solid line.

A target input torque Tint to the transmission 4 becomes a negative value. An actual input torque Tina to the transmission 4 gradually changes in accordance with the target input torque Tint. Regarding the input torques in FIG. 7, the target input torque Tint is indicated by the dashed line and the actual input torque Tina by the solid line.

At a time t1, the vehicle speed VSP becomes lower than the first predetermined vehicle speed VSP1 and the brake pedal 63 is pressed. This increases the target braking torque Tb to generate the regenerative braking torque Trg, the target input torque Tint increases to the negative side (the absolute value increases), and the actual input torque Tina increases to the negative side in accordance with the target input torque Tint (the absolute value increases).

In addition to the downshift along the coast shift line, the final target speed ratio if is set such that the downshift is performed to raise the regeneration efficiency E of the motor-generator 2. The target speed ratio it is changed following the final target speed ratio if and the actual speed ratio ia changes. Here, in addition to the hydraulic pressure required for the downshift along the coast shift line, the hydraulic pressure required for the downshift to raise the regeneration efficiency E of the motor-generator 2 is included in the second hydraulic pressure Psec2, thereby stepwisely raising the second hydraulic pressure Psec2. The required secondary pressure Psecn also stepwisely increases.

Since the actual speed ratio ia changes to the Low side and the actual primary rotation speed Npria rises, the amount of oil discharged from the oil pump 70 increases and the actual secondary pressure Pseca rises.

When the required secondary pressure Psecn becomes higher than the actual secondary pressure Pseca at a time t2, the regenerative braking torque regulation value Trglim is set and the regenerative braking torque Trg is regulated. Regarding the input torque in FIG. 7, an input torque regulation value Tinlim equivalent to the regenerative braking torque regulation value Trglim is indicated by the one dot chain line. Since the regenerative braking torque Trg is thus regulated, the actual input torque Tina to the transmission 4 decreases to the negative side (the absolute value decreases). The regenerative braking torque regulation value Trglim is set according to the pressure difference between the required secondary pressure Psecn and the actual secondary pressure Pseca. The increase in the pressure difference increases the regenerative braking torque regulation value Trglim and the actual input torque Tina decreases to the negative side (the absolute value decreases). Here, since the second hydraulic pressure Psec2 required for the shift is secured, the actual speed ratio ia does not cause the shift failure and changes following the target speed ratio it.

When the actual speed ratio ia is changed to the Low side and the actual primary rotation speed Npria rises, the hydraulic pressure required for the downshift to increase the regeneration efficiency E of the motor-generator 2 becomes small. Accordingly, at a time t3, the second hydraulic pressure Psec2 lowers and the increased amount of the required secondary pressure Psecn decreases. The first hydraulic pressure Psec1 can be raised by the amount that the second hydraulic pressure Psec2 can be decreased as the actual primary rotation speed Npria (the motor rotation speed Nm) approaches the rotation speed to raise the regeneration efficiency E of the motor-generator 2. Accordingly, the regenerative braking torque Trg (the motor torque Tm) can be increased and an amount of regeneration can be increased.

Since the reduction in the pressure difference between the required secondary pressure Psecn and the actual secondary pressure Pseca decreases the regenerative braking torque regulation value Trglim and decreases the input torque regulation value Tinlim, the actual input torque Tina increases to the negative side (the absolute value increases).

When the actual secondary pressure Pseca becomes higher than the required secondary pressure Psecn at a time t4 and the actual secondary pressure Pseca becomes higher than the value found by adding the second predetermined pressure P2 to the required secondary pressure Psecn at a time t5, the regulation on the regenerative braking torque Trg is lifted.

A description will be given of advantageous effects according to the embodiment of the present invention.

To perform the regenerative braking by the motor-generator 2, the first hydraulic pressure Psec1, which is the hydraulic pressure that does not cause the belt slip relative to the regenerative braking torque Trg input to the transmission 4, is set to equal to or less than the hydraulic pressure found by subtracting the second hydraulic pressure Psec2, which is required to downshift the transmission 4, from the actual secondary pressure Pseca. This ensures reducing the shift failure in the transmission 4 during the regenerative braking, reducing the reduction in the rotation speed Nop of the rotation shaft of the oil pump 70 due to the shift failure, and reducing the insufficient input and output of the amount of oil.

It should be noted that, it is also considered that, when the required secondary pressure Psecn is higher than the actual secondary pressure Pseca, the first hydraulic pressure Psec1 is prioritized and the second hydraulic pressure Psec2 is lowered, that is, the shift by the transmission 4 is delayed. However, the shift failure in the transmission 4 causes the insufficient input and output of the amount of oil due to the reduction in the rotation speed Nop of the rotation shaft of the oil pump 70, resulting in the belt slip. Therefore, this embodiment prioritizes the second hydraulic pressure Psec2 to reduce the shift failure in the transmission 4.

In the case where the regenerative braking is performed and the required secondary pressure Psecn is higher than the actual secondary pressure Pseca, the regenerative braking torque Trg is lowered based on the pressure difference between the required secondary pressure Psecn and the actual secondary pressure Pseca. This reduces the shift failure in the transmission 4 and reduces the insufficient input and output of the amount of oil. Additionally, this decreases the actual input torque Tina input to the transmission 4 (the absolute value decreases), thereby ensuing reducing the belt slip in the transmission 4.

In the case where the actual speed ratio ia is not changed along the coast shift line during the coast running, the actual primary rotation speed Npria possibly lowers compared with the case where the actual speed ratio ia is changed along the coast shift line. To prevent the insufficient input and output of the amount of oil, the coast shift line is set such that the rotation speed Nop of the rotation shaft of the oil pump 70 does not become lower than the lower limit rotation speed Nolim. Therefore, in the case where the actual speed ratio ia is not changed along the coast shift line, the rotation speed Nop of the rotation shaft of the oil pump 70 becomes lower than the lower limit rotation speed Nolim. This causes the insufficient input and output of the amount of oil and lowers the actual secondary pressure Pseca, possibly causing the belt slip in the transmission 4.

This embodiment sets the second hydraulic pressure Psec2 to the hydraulic pressure including the hydraulic pressure that ensures shifting the actual speed ratio ia along the coast shift line during the regenerative braking. This ensures reducing the rotation speed Nop of the rotation shaft of the oil pump 70 becoming lower than the lower limit rotation speed Nolim and ensures reducing the belt slip in the transmission 4.

The second hydraulic pressure Psec2 is set to the hydraulic pressure including the hydraulic pressure at which the transmission 4 is downshifted such that the motor rotation speed Nm of the motor-generator 2 becomes the rotation speed at which the regeneration efficiency E of the motor-generator 2 becomes high during the regenerative braking. This ensures setting the motor rotation speed Nm to the rotation speed at which the regeneration efficiency E of the motor-generator 2 becomes high during the regenerative braking, thereby ensuring improving the regeneration efficiency E of the motor-generator 2.

In the case where the first clutch 12 is engaged during the regenerative braking, the engine 1 is dragged when the transmission 4 is downshifted to raise the regeneration efficiency E of the motor-generator 2 and the engine 1 acts as a load. This possibly fails to raise the motor rotation speed Nm up to the rotation speed at which the regeneration efficiency E of the motor-generator 2 rises.

In this embodiment, disengaging the first clutch 12 during the regeneration braking allows the transmission 4 to be downshifted such that the motor rotation speed Nm becomes the rotation speed at which the regeneration efficiency E of the motor-generator 2 rises during the regenerative braking.

The embodiment of the present invention described above is merely illustration of some application examples of the present invention and not of the nature to limit the technical scope of the present invention to the specific constructions of the above embodiment.

While the embodiment gives the description using the hybrid vehicle, the embodiment may be applied to an electric vehicle.

The transmission 4 is not limited to a belt continuously variable transmission mechanism but may be a chain continuously variable transmission mechanism.

The present application claims a priority of Japanese Patent Application No. 2015-59515 filed with the Japan Patent Office on Mar. 23, 2015, all the contents of which are hereby incorporated by reference.

The invention claimed is:

1. A vehicle control device for controlling a vehicle including: a continuously variable transmission disposed between a motor-generator and driving wheels; an oil pump configured to be driven by transmission of rotation of the motor-generator; and a hydraulic pressure supply controller configured to supply a hydraulic pressure to the continuously variable transmission, the hydraulic pressure being generated by regulating a pressure of oil discharged from the oil pump, wherein the hydraulic pressure supply controller is configured such that when regenerative braking is performed by the motor-generator based on a deceleration request from a driver, the hydraulic pressure supply controller supplies a hydraulic pressure based on a first hydraulic pressure and a second hydraulic pressure to the continuously variable transmission, the first hydraulic pressure being a hydraulic pressure to transmit an input torque input to the continuously variable transmission during the regenerative braking, the second hydraulic pressure being a hydraulic pressure to shift the continuously variable transmission during the regenerative braking, and during the regenerative braking, the hydraulic pressure supply controller is configured to set the first hydraulic pressure to be equal to or less than a hydraulic pressure determined by subtracting the second hydraulic pressure from a hydraulic pressure suppliable to the continuously variable transmission.

2. The vehicle control device according to claim 1, comprising a torque controller configured to generate a regenerative braking torque by the motor-generator during the regenerative braking to control the input torque input to the continuously variable transmission, wherein the torque controller is configured such that when a hydraulic pressure determined by adding the first hydraulic pressure to the second hydraulic pressure is higher than the hydraulic pressure suppliable to the continuously variable transmission during the regenerative braking, the torque controller lowers the regenerative braking torque based on a difference between the added hydraulic pressure and the hydraulic pressure suppliable to the continuously variable transmission.

3. The vehicle control device according to claim 1, wherein when the vehicle decelerates without an accelerator pedal pressed, the second hydraulic pressure includes a hydraulic pressure where a speed ratio of the continuously variable transmission is changed to a speed ratio at which the oil pump discharges more oil than a minimum discharge amount of the oil pump.

4. The vehicle control device according to claim 1, wherein when the vehicle decelerates without the accelerator pedal pressed, the second hydraulic pressure includes a hydraulic pressure where the speed ratio of the continuously variable transmission is changed to a speed ratio at which a rotation speed of a rotation shaft of the motor-generator becomes a rotation speed to increase a regeneration efficiency at the motor-generator.

5. The vehicle control device according to claim 4, wherein:

the continuously variable transmission is configured to transmit torque from an engine of the vehicle via a friction engaging element and the motor-generator, and the friction engaging element is configured to be disengaged during the regenerative braking.

6. A method for controlling a vehicle including a continuously variable transmission disposed between a motor-generator and driving wheels and an oil pump configured to be driven by transmission of rotation of the motor-generator, the vehicle supplying a hydraulic pressure to the continuously variable transmission, the hydraulic pressure being generated by regulating a pressure of oil discharged from the oil pump, the method comprising:

when regenerative braking is performed by the motor-generator based on a deceleration request from a driver, supplying a hydraulic pressure based on a first hydraulic pressure and a second hydraulic pressure to the continuously variable transmission, the first hydraulic pressure being a hydraulic pressure to transmit an input torque input to the continuously variable transmission during the regenerative braking, the second hydraulic pressure being a hydraulic pressure to shift the continuously variable transmission during the regenerative braking, and during the regenerative braking, setting the first hydraulic pressure to be equal to or less than a hydraulic pressure determined by subtracting the second hydraulic pressure from a hydraulic pressure suppliable to the continuously variable transmission.

7. A vehicle control device for controlling a vehicle including: a continuously variable transmission disposed between a motor-generator and driving wheels; an oil pump configured to be driven by transmission of rotation of the motor-generator; and hydraulic pressure supply means for supplying a hydraulic pressure to the continuously variable transmission, the hydraulic pressure being generated by regulating a pressure of oil discharged from the oil pump, wherein when regenerative braking is performed by the motor-generator based on a deceleration request from a driver, the hydraulic pressure supply means supplies a hydraulic pressure based on a first hydraulic pressure and a second hydraulic pressure to the continuously variable transmission, the first hydraulic pressure being a hydraulic pressure to transmit an input torque input to the continuously variable transmission during the regenerative braking, the second hydraulic pressure being a hydraulic pressure to shift the continuously variable transmission during the regenerative braking, and during the regenerative braking, the hydraulic pressure supply means sets the first hydraulic pressure to be equal to or less than a hydraulic pressure determined by subtracting the second hydraulic pressure from a hydraulic pressure suppliable to the continuously variable transmission.

\* \* \* \* \*